(12) United States Patent
Xie et al.

(10) Patent No.: US 10,726,078 B2
(45) Date of Patent: Jul. 28, 2020

(54) METHOD AND SYSTEM FOR DYNAMIC SCORE FLOOR MODELING AND APPLICATION THEREOF

(71) Applicant: Yahoo Holdings, Inc., Sunnyvale, CA (US)

(72) Inventors: Zhihui Xie, Sunnyvale, CA (US); Kuang-Chih Lee, Fremont, CA (US); Pradip Thachile, Sunnyvale, CA (US)

(73) Assignee: Oath Inc., New York, NY (US)

( * ) Notice: Subject to any disclaimer, the term of this patent is extended or adjusted under 35 U.S.C. 154(b) by 405 days.

(21) Appl. No.: 15/590,139

(22) Filed: May 9, 2017

(65) Prior Publication Data

US 2018/0329994 A1   Nov. 15, 2018

(51) Int. Cl.
*G06Q 30/00* (2012.01)
*G06F 16/951* (2019.01)
*G06Q 30/02* (2012.01)
*G06Q 30/08* (2012.01)

(52) U.S. Cl.
CPC .......... *G06F 16/951* (2019.01); *G06Q 30/02* (2013.01); *G06Q 30/0242* (2013.01); *G06Q 30/0247* (2013.01); *G06Q 30/0251* (2013.01); *G06Q 30/0256* (2013.01); *G06Q 30/0273* (2013.01); *G06Q 30/0275* (2013.01); *G06Q 30/0277* (2013.01); *G06Q 30/08* (2013.01)

(58) Field of Classification Search
CPC .................................. G06Q 30/06–08
USPC ............................... 705/26.1–27.2
See application file for complete search history.

(56) References Cited

U.S. PATENT DOCUMENTS

2015/0081397 A1* 3/2015 Hummel .......... G06Q 10/06375
                                                                   705/7.37

* cited by examiner

*Primary Examiner* — Ethan D Civan
(74) *Attorney, Agent, or Firm* — Pillsbury Winthrop Shaw Pittman LLP

(57) ABSTRACT

The present teaching relates to dynamically generate a score floor model that provides a dynamically determined threshold metric to be used to select future bids that satisfy a first and second set of metrics. Feedback information is first received that relates to a plurality of bids previously submitted by a bidder to a publisher, wherein the feedback information indicates whether each of the plurality of bids has led to an impression. The first set of metrics specified by the publisher is obtained and the second set of metrics is retrieved. The score floor model with respect to the publisher is dynamically updated based on the feedback information as well as the first and second sets of metrics.

20 Claims, 13 Drawing Sheets

METHOD AND SYSTEM FOR DYNAMIC SCORE FLOOR MODELING AND APPLICATION THEREOF

BACKGROUND

1. Technical Field

The present teaching generally relates to Internet. More specifically, the present teaching relates to online advertisement.

2. Technical Background

With the development of the Internet, online advertising has become the financial backbone of various Internet operations. In the online auction landscape, various companies participate in a marketplace exchange, in which a publisher may maintain a waterfall structure and require an exchange to maintain its performance at a certain level as a condition to participate. This is shown in FIG. 1A (PRIOR ART). In this conventional framework, a user 110 may access a webpage 120 of a publisher 130, which has a spot on the page for displaying an advertisement 120-1. When the publisher 130 invokes the webpage 120 to be presented to the user 110, the publisher 130 monetizes its space on the webpage 120 by soliciting bids of placing an advertisement on spot 120-1. The solicitation for bids is sent from the publisher 130 to a plurality of bidders, which include bidder 1 142, bidder 2 144, ..., bidder i 146, ..., and bidder N 148. Some bidders may bidder may have inventory of their own so that they can present their bids to the publisher 130 directly (e.g., bidder 2 144 and bidder N 148). Some bidders may correspond to an exchange, which means that each of them may further solicit bids from other downstream bidders. As illustrated, bidder 1 142 may further solicit bids from its connected downstream bidders (bidder 11 151, ..., bidder $1K_1$ 152). Similarly, bidder i 146 may further solicit bids from its connected downstream bidders (bidder i1 155, ..., bidder $iK_i$ 156). Bidder 1 142 and bidder i 146 may select a winning bid from their respective downstream bidders and submit such selected winning bids as their bids to the publisher 130. The publisher 130 may then select one of the bids that it receives from different bidders to be the ultimate winning bid and then display the advertisement represented by the ultimate winning bid at the spot 120-1 on webpage 120. The status information on whether the display is successful may later be collected.

Therefore, in operation, an exchange may receive a bid request from a publisher and then turns around to take bid responses from advertisers. The exchange may then select a bid response as its bid and submit it to the publisher as its response to the publisher's bid request. When a waterfall structure is not present, the same applies to an advertiser.

The publisher may keep track of performance of each exchange/advertiser and downgrade or upgrade an exchange/advertiser's level based on its performance. Depending on the level, an exchange/advertiser may receive a different level of reward for each winning bid. When an exchange/advertiser at a certain level fails to achieve the performance associated with that level, it may be downgrade automatically. An exchange/advertiser therefore has an incentive to upgrade or at least maintain its level. Examples of required performance include a minimum impression rate and a response rate. The former may correspond to, e.g., a percentage of winning bids that lead to a display of the advertisement or actual impression. An exchange may win some auctions that, for whatever reason, do not lead to impressions. The latter may correspond to, e.g., a percentage of time that an exchange actual responds to the publisher's bid request.

Different publishers may have different requirements for different levels. In addition, a publisher may change, from time to time, its requirements associated with different levels. Thus, it can be challenging to ensure that an exchange/advertiser at a certain level of a publisher to achieve relevant required performance in a dynamic operation environment. It is even more challenging when optimizing one performance requirement may cause some form of penalty in another performance requirement. In some situations, optimizing the performance required by the publisher may also be in conflict with the bottom line financial interest of the exchange/advertiser. Taking the impression rate as an example, to achieve a higher impression rate to meet the publisher's requirement, the exchange may selectively avoid responding to some bid requests that may not lead to an impression. However, when more bids are blocked, response rate may suffer, which is also required by the publisher. In addition, when more bids are blocked, the exchange/advertiser loses the opportunity to gain financially. But if increasing the response rate, although it will increase the chance to gain financially, the impression rate may drop.

Thus, an improved approach to filter and select a winning bid is needed. The present teaching aims to provide such an improved solution.

SUMMARY

The teachings disclosed herein relate to methods, systems, and programming for advertising. More particularly, the present teaching relates to methods, systems, and programming related to exploring sources of advertisement and utilization thereof.

In some embodiments, the present teaching discloses to dynamically generate a score floor model that provides a dynamically determined threshold metric to be used to select future bids that satisfy a first and second set of metrics. Feedback information is first received that relates to a plurality of bids previously submitted by a bidder to a publisher, wherein the feedback information indicates whether each of the plurality of bids has led to an impression. The first set of metrics specified by the publisher is obtained and the second set of metrics is retrieved. The score floor model with respect to the publisher is dynamically updated based on the feedback information as well as the first and second sets of metrics.

In other embodiments, the present teaching discloses a system that comprises a dynamic score floor model generator and a score floor model based bid generator. The dynamic score floor model generator is configured for dynamically generating a score floor model with respect to a publisher, wherein the score floor model provides a dynamically determined threshold metric to be used to select future bids to the publisher that satisfy a first and a second sets of metrics. The score floor model based bid generator configured for identifying a response bid selected based on the score floor model in response to a bid request received from the publisher.

In yet another embodiment, the present teaching discloses machine readable medium that stored information, which when read by the machine, will cause the machine to perform various operational steps. These steps include receiving feedback information about a plurality of bids previously submitted by a bidder to a publisher, wherein the feedback information indicates whether each of the plurality of bids has led to an impression, obtaining a first set metrics specified by the publisher, retrieving a second set of metrics to be applied to the bidder, and dynamically updating a score floor model with respect to the publisher based on the feedback information as well as the first and second sets of metrics. The score floor model provides a dynamically determined threshold metric to be used to select future bids that satisfy the first and second sets of metrics.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
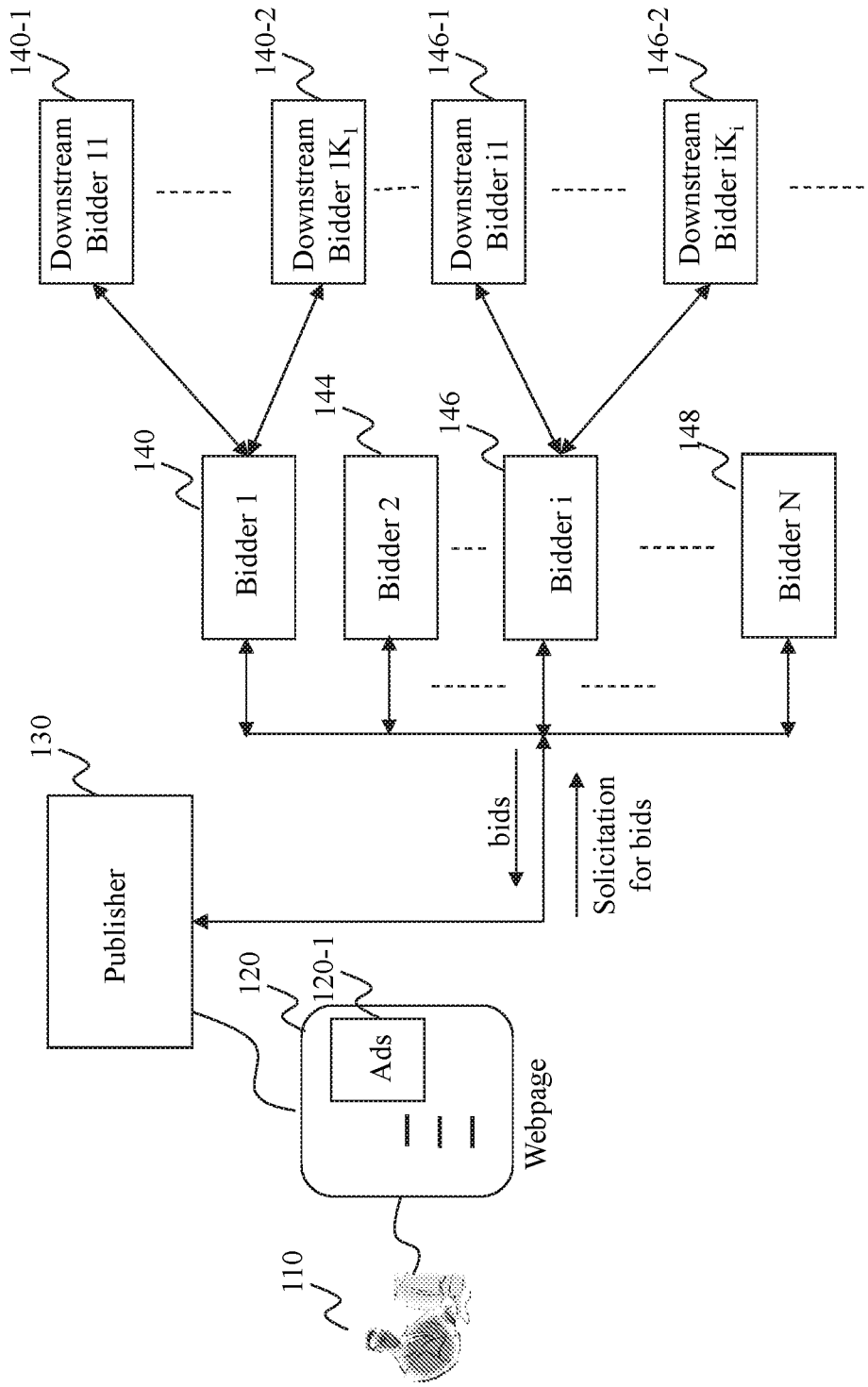
FIG. 1A (Prior Art) depicts a conventional framework for online advertising.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations and applications thereof directed to online advertising which performs a bid selection based on dynamically optimized score floor models. For each publisher that requests a bid for online advertising, there is a corresponding score floor model optimized with respect to the publisher's requirements as well as certain criteria of the bidder, which can be either an exchange or an advertising agent. Such a score floor model can be dynamically optimized based on continuously collected relevant data. With an optimized score floor model, a dynamic score floor can be adaptively established and used in selecting bids that most likely will maximize the performance with respect to the publisher's performance requirements in a balanced manner as well as achieve the revenue goal of the bidder.

In some embodiments, the task is to adaptively set an optimal score floor that will be used to filter received bids to facilitate the selection of a winning bid in such a way that maximizes the impression rate with a satisfactory response rate of the corresponding publisher and at the same time, meet the expected revenue level of the bidder. The goal is to maintain a certain impression rate in order to clinch on or climb the level in the waterfall hierarchy and at the same time maximize the revenue at that level.

To achieve this, the present teaching discloses an approach to create a score floor to block out some bids so that the remaining bids have a lower fall out rate in case they become the winning bids. As discussed herein, when a low floor is set, fall out rate increases. If a high floor is set, more bids will be filtered out and, in the extreme case, it may lead to no sale which impacts negatively the bottom line. A higher score floor may lead to better efficiency in terms of the impression rate as well as the revenue per advertisement request. However, it may lead to lower response rate. A balanced approach to maximize the effectiveness in the marketplace may be to attract more traffic from publishers (by satisfying the performance requirements) and at the same time to preserve the bottom line financial interests. This may then yield an all-win situation among users, publishers, exchange platform and advertisers.

The problem of finding an optimal score floor itself is a nonlinear and nonconvex multidimensional stochastic optimization problem. It is noted that there is a monotonic relationship between a score floor and revenue. It is possible to implement a solution via a quick grid search on a finite solution space. Such a grid search will rerun the auctions given different score floors and the highest floors that satisfied a current revenue constraint may be selected. However, this is a solution that may be mechanical and non-adaptive and it does not consider the past historic data and depends on only what was designed in a fixed manner.

Figure 1B:
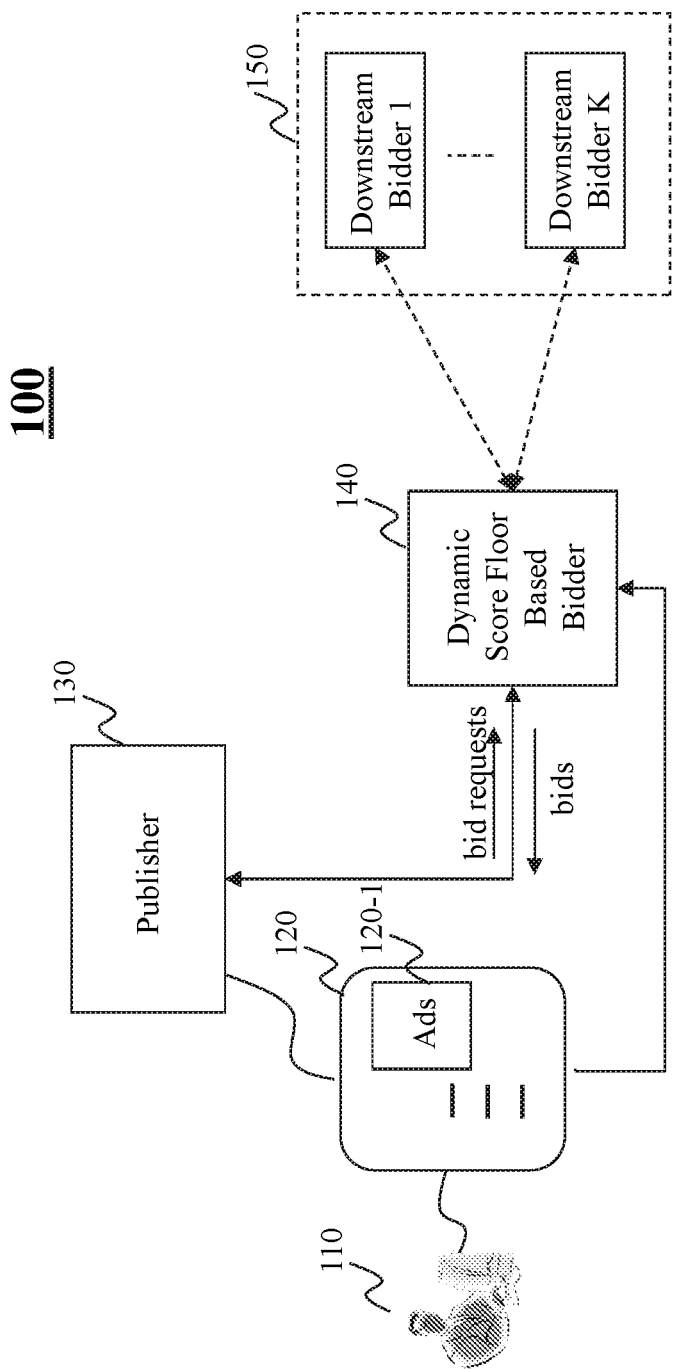
FIG. 1B depicts a framework of online advertising incorporated therewith a creative score floor model based bid selection optimizer, according to an embodiment of the present teaching.

FIG. 1B depicts a framework 100 of online advertising scheme with a dynamic score floor based bidder 140, according to an embodiment of the present teaching. For simplicity of illustration, only one bidder, the dynamic score floor based bidder 140 (an exchange or an advertiser) is shown to be connected to the publisher 130. In practice, there can be many bidders connected to the publisher 130. In this online advertising scheme, the dynamic score floor based bidder 140 is connected to a plurality of downstream bidders 150. When the dynamic score floor based exchange 140 receives a request for an ad bid, it turns around to solicit downstream bids from its downstream bidders 150. When receiving bids from downstream bidders 150, the dynamic score floor based exchange 140 filters the bids based on a dynamically determined score floor so that bids that have scores fall below the dynamic score floor are not considered. The dynamically established score floor is optimized with respect to the performance requirements of the publisher 130 (e.g., the impression rate and response rate) and the expected revenue level of the bidder 140. Among remaining bids from downstream bidders, a bid is selected by the dynamic score floor based bidder 140 and returned to the publisher 130 in response to the request for an ad bid.

The bid selected by the dynamic score floor based bidder 140 may then be presented to the publisher 130. If the presented bid is chosen by the publisher as a winning bid, the advertisement associated with the bid is presented in webpage 120 within the ads space 120-1. Upon viewing the advertisement on webpage 120, the user 110 may react to the advertisement. For example, the user may proceed to order what is being advertised in the advertisement. The user 110 may also react negatively by leaving the webpage 120. Such user reaction to the advertisement may also be fed back to the dynamic score floor based bidder 140 in a feedback loop so that the dynamic score floor model based bidder 140 may continuously learn from the past and refine the score floor based approach.

Although the dynamic score floor based bidder 140 may be an exchange, as just discussed, it may also correspond to a bidder that has no downstream bidders and, hence, will generate a bid based on its own ad inventory. In this case, there is no connection with downstream bidders 150 (the line connected to the downstream bidders 150 is dotted, indicating that the connection is optional).

As mentioned herein, for illustration purposes, only one dynamic score floor based bidder 140 and one publisher 130 are shown in FIG. 1B. In operation, the publisher 130 may be connected to a plurality of dynamic score floor based bidders (not shown). In this case, each of the dynamic score floor based bidders connected therewith may optimize their respective score floors with respect to both the performance requirements of the publisher (this is the same for all connected dynamic score floor based bidders) and the specific expected revenue requirement of each respective bidder. On the other hand, each dynamic score floor based bidder 140 may also be connected to more than one publisher (not shown). In some embodiments, the dynamic score floor based bidder 140 may be configured to establish a dynamic score floor for each respective publisher, optimized with respect to the performance requirements of the respective publisher (in addition to the expected revenue level of the bidder). Although the following disclosure is provided with respect to FIG. 1B where only one publisher and one bidder are illustrated, the disclosed approach may be applied to any of the above discussed configurations or any additional configuration.

Figure 2A:
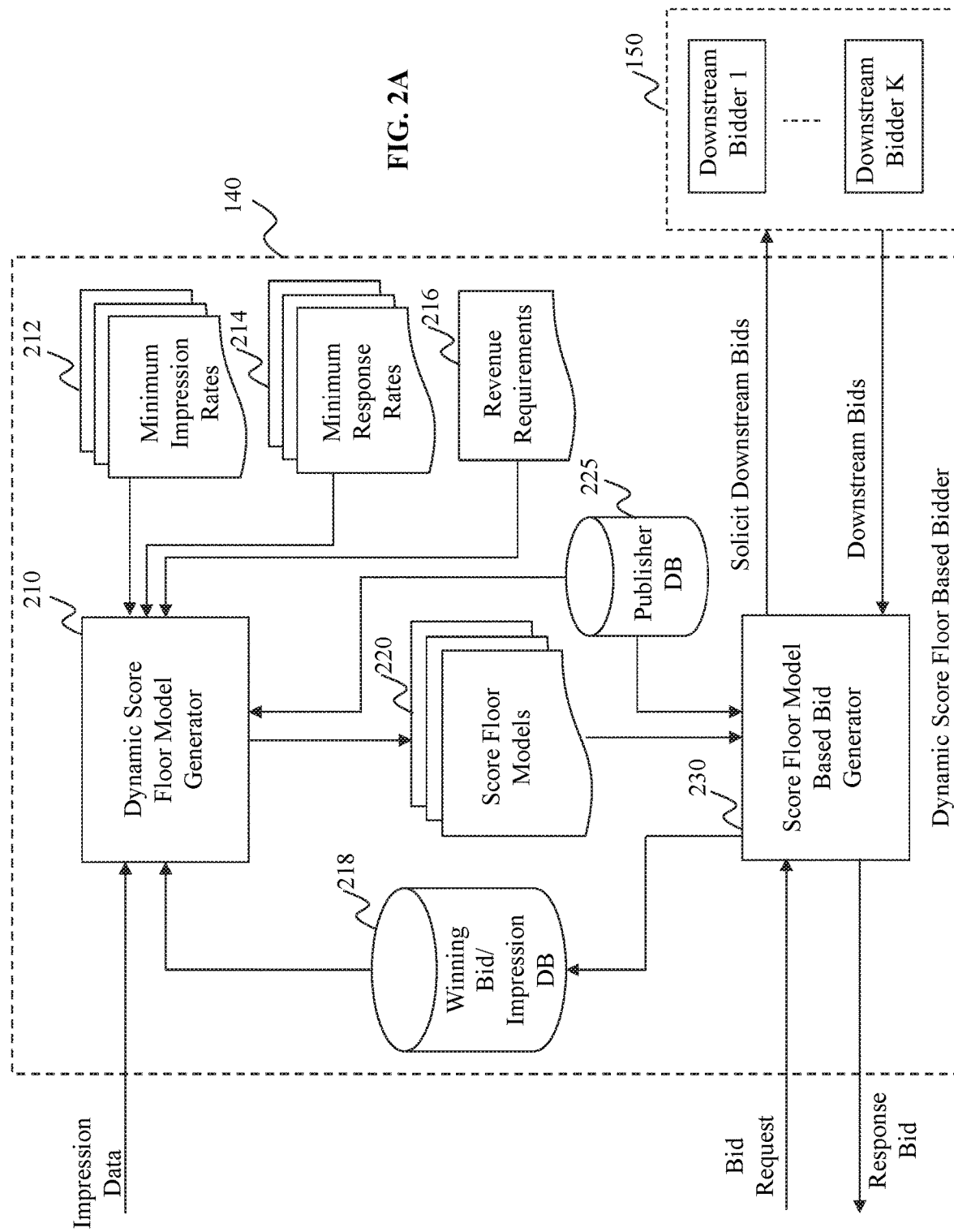
FIGS. 2A and 2B depict different exemplary high level internal system diagrams of a dynamic score floor based bidder, according to an embodiment of the present teaching.

FIG. 2A depicts an exemplary internal high level system diagram of the dynamic score floor based bidder 140, according to an embodiment of the present teaching. In FIG. 2A, the internal high level system diagram is for a dynamic score floor based bidder that is an exchange that connects to one or more downstream bidders 150. In this illustrated embodiment, the dynamic score floor based bidder 140 comprises a dynamic score floor model generator 210 and a score floor model based bid generator 230. The dynamic score floor model generator 210 is provided to create a dynamic score floor model 220, which can be used by the score floor model based bid generator 230 to dynamically determine, based on the score floor model 220, a score floor, at any time of the operation, and to filter the bids from downstream bidders 150. The score floor models 220 are generated subject to various constraints, which may be imposed by different publishers or by the bidder itself such as a required revenue level. The constraints from the publisher 130 include minimum impression rates 212 as well as minimum response rates 214. Its own revenue requirement may be stored in 216. Those constraints may be dynamically updated and the updated constraints may be further considered and used to update score floor models 220.

To generate publisher specific score floor models, the dynamic score floor model generator 210 may access publisher information stored in the publisher database 225 to establish or update information stored in the minimum impression rates 212 and minimum response rate 214. In addition, in creating or updating the score floor models 220, the dynamic score floor model generator 210 may also access information stored in a winning bid impression database 218. Information stored in the winning bid impression database 218 may indicate whether a winning bid (selected previously by the publisher 130) has led to an actual impression (successful from the bidder's perspective). In some situations, a winning bid may have led to an impression and in some situation, it may not. Such information may be used to train or re-train the score floor models 220. The purpose is to use such score floor models 220 to create dynamically adaptive score floors.

In operation, when the dynamic score floor based bidder 140 receives a bid request, it solicits, from downstream bidders 150, advertisement bids. When downstream bids are received from the downstream bidders 150, the score floor model based bid generator 230 determines a dynamic score floor, based on the score floor models 220, and uses the dynamic score floor to filter the received downstream bids so that only those downstream bids that have a score above the score floor are kept. A bid is then selected from the remaining downstream bids and returned to the publisher 130 in response to the bid request.

Figure 2B:
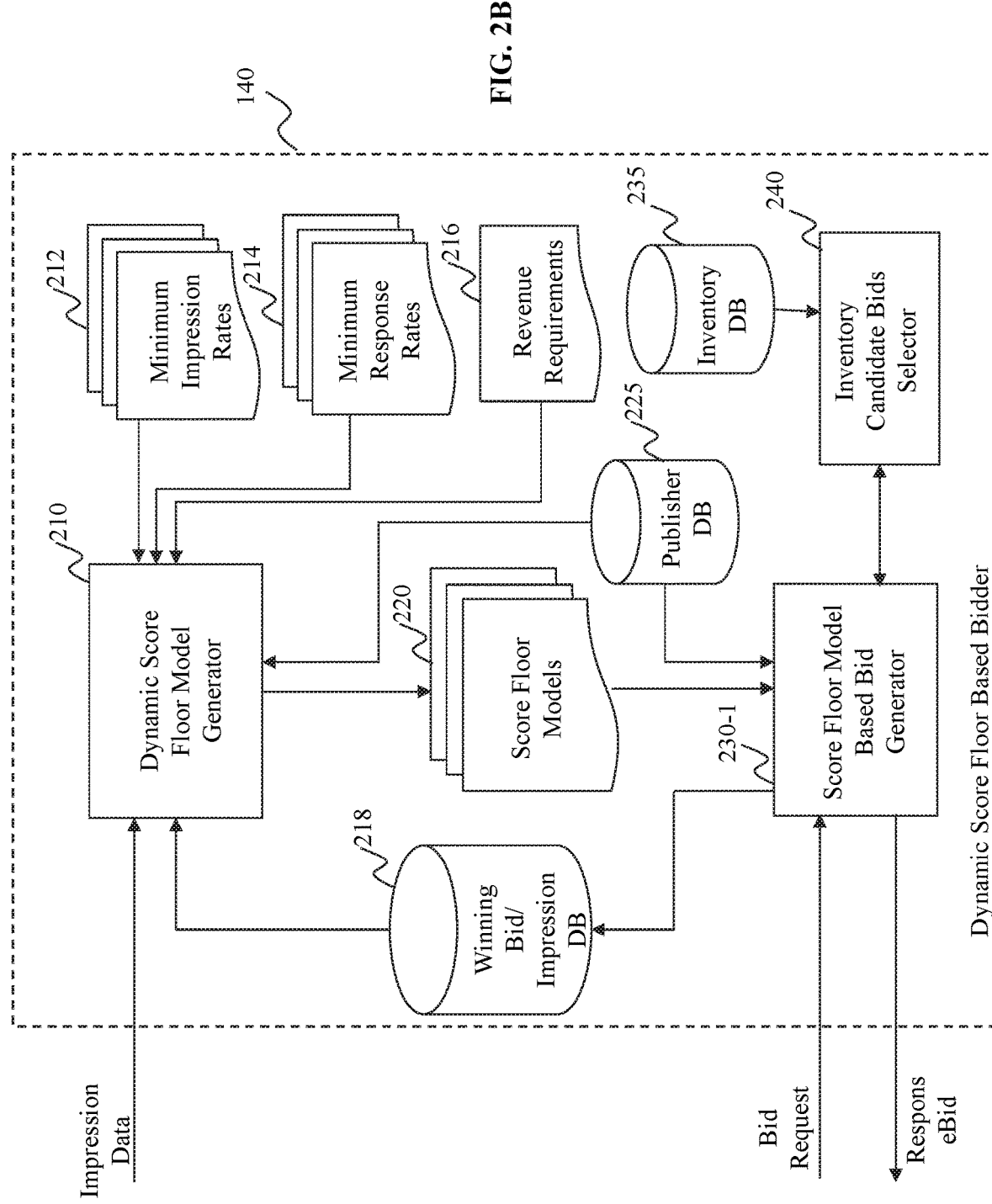

FIG. 2B depicts another exemplary internal high level system diagram of the dynamic score floor based bidder 140, according to a different embodiment of the present teaching. FIG. 2B presents an exemplary internal high level system diagram for a dynamic score floor based bidder that does not have any downstream bidder. That is, in this embodiment, the dynamic score floor based bidder 140 is a bidder that responds and bids directly in response to the publisher 130. Similarly, in this embodiment, the dynamic score floor based bidder 140 comprises the dynamic score floor model generator 210 and the score floor model based bid generator 230, with similar functions as discussed with respect to FIG. 2A. In this embodiment, the dynamic score floor based bidder 140 comprises also an inventory selector 240 and an inventory data base 235. The inventory selector 240 may select inventory candidate advertisements that may be considered in selecting as a bid to be presented to the publisher 130. The selected inventory candidate advertisements may then be sent to the score floor model based bid generator 230-1, which may then apply the dynamic score floor derived based on the score floor models 220 to filter the inventory candidate advertisements before a bid is selected to respond to the bid request from the publisher 130.

In operation, when the dynamic score floor based bidder 140 receives a bid request, it may invoke the inventory selector 240 to produce candidate bids. Upon receiving the selected inventory candidate advertisements, the score floor model based bid generator 230 determines a dynamic score floor, based on the score floor models 220, and uses the dynamic score floor to filter the received inventory candidate advertisements so that only those inventory candidates that have a score above the score floor are kept. A bid is then selected from the remaining inventory candidates and returned to the publisher 130 in response to the bid request.

Figure 3:
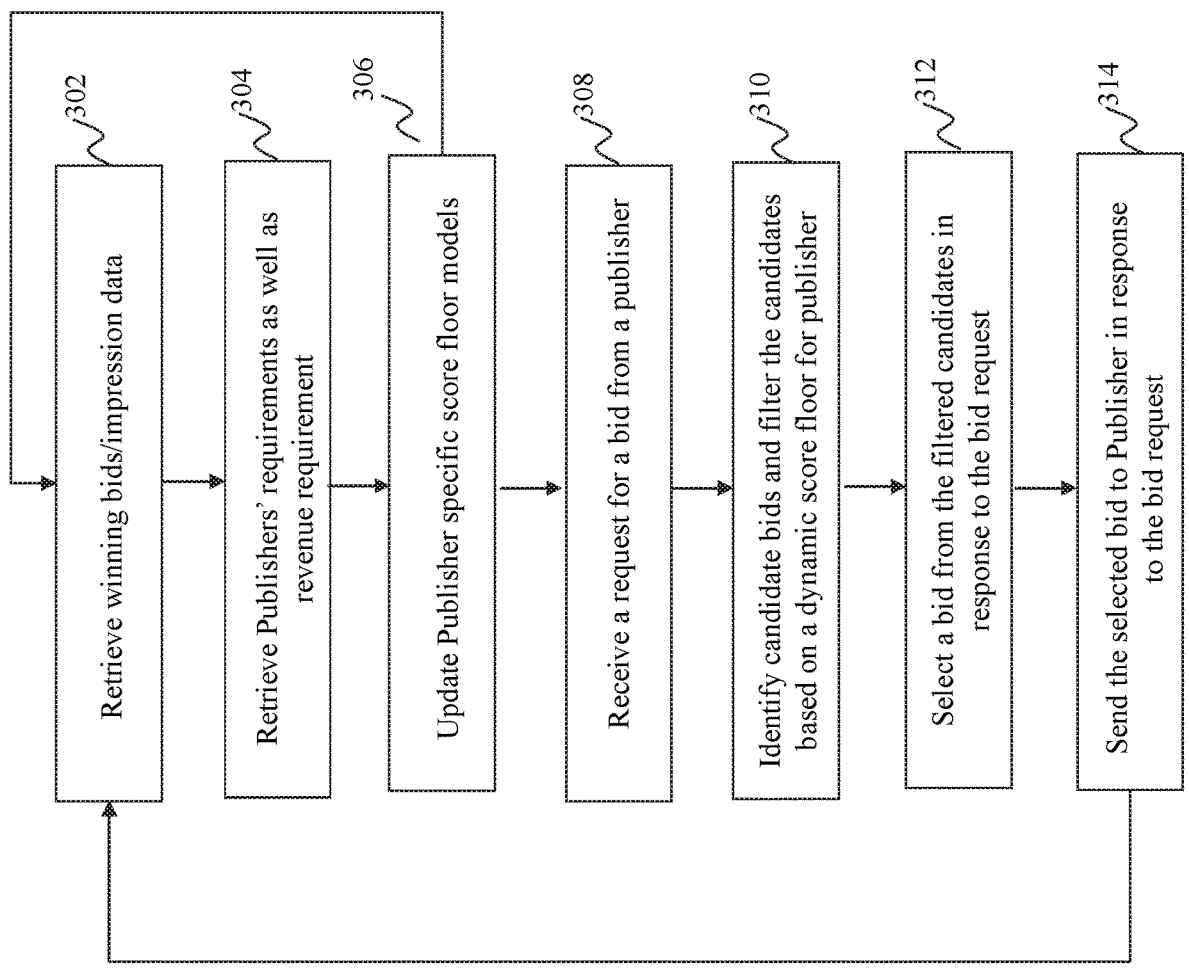
FIG. 3 is a flowchart of an exemplary process of a dynamic score floor based bidder, according to an embodiment of the present teaching.

FIG. 3 is a flowchart of an exemplary process of the dynamic score floor based bidder 140, according to an embodiment of the present teaching. The flowchart as described in FIG. 3 includes operational steps involved in two separate stages of the operation. One is the stage of deriving the score floor models. The other stage is applying such derived score floor models in the process of selecting a bid to respond to a bid request from the publisher 130. To derive score floor models, the dynamic score floor based bidder 140 retrieves feedback information, at 302, related to whether a bid presented to the publisher 130 and selected as a winning bid has led to an impression. Such information may be used as training data for deriving the score floor models.

As discussed herein, due to difference in performance requirement among different publishers, score floor models related to a publisher may be derived separately. To generate score floor models for a specific publisher, different types of information to be used as constraints of the score floor models, e.g., the performance requirements of a relevant publisher and the revenue requirement of the bidder, is retrieved at 304. Using such information, each publisher specific score floor models are derived at 306. The steps involved in the first stage of dynamically updating score floor models may then repeat so that the models are continuously updated.

When the bidder 140 receives, at 308, a bid request from a publisher, the bidder may proceed to identify, at 308, candidate bids from which a bidder may be selected as a response to the bid request are identified and filtered, at 310, to generate a filtered pool of candidate bids. A bid is then selected, at 312, from the filtered candidate bids and presented, at 314, to the publisher as a bid in response to the bid request.

Figure 4:
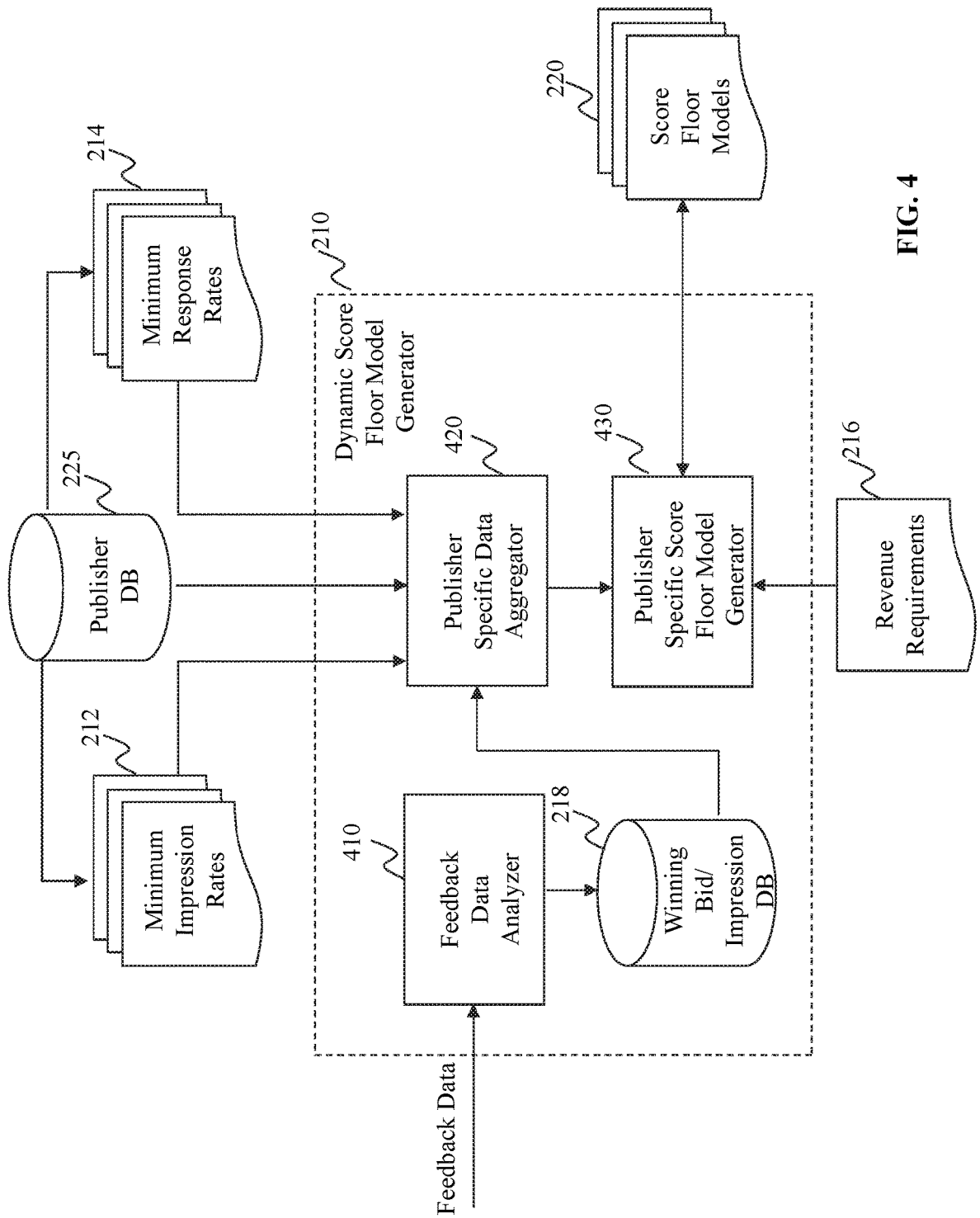
FIG. 4 depicts an exemplary high level internal system diagram of a dynamic score floor model generator, according to an embodiment of the present teaching.

FIG. 4 depicts an exemplary high level internal system diagram of the dynamic score floor model generator 210, according to an embodiment of the present teaching. As discussed herein, the score floor models are created with respect to each publisher because each publisher may have different performance requirements. In this exemplary embodiment, the dynamic score floor model generator 210 comprises an impression data analyzer 410, a publisher specific data aggregator 420, and a publisher specific score floor model generator 430. The publisher specific data aggregator 420 may gather or consolidate information related to each publisher and provide such gathered information to the publisher specific score floor model generator 430 as training data. The publisher specific score floor model generator 430 may then utilize such publisher specific training data to generate or update the score floor models specific to each publisher.

The impression data analyzer 410 may dynamically receive feedback impression information on each of the bids that the bidder 140 sent to different publishers. Such information may include, e.g., whether each bid sent to a publisher was actually selected as a winning bid and if so, whether the winning bid actually was displayed or yielded an impression, and whether the impression had led to some economic gain such as a conversion event. Such collected information may be analyzed by the impression data analyzer 410 and then stored in the winning bid impression database 218. For example, the collected data may be indexed based on publishers, advertisement identifiers, date/time, locale, and/or the outcome (impression or not), etc. Such indexed data may later be retrieved based on different indices. For example, in updating a publisher specific score floor model, in order to gather relevant training data, the publisher specific data aggregator 420 may retrieve, from the winning bid/impression database 218, information related to bids that have been provided to the specific publisher.

For generating/updating each publisher specific score floor model, the publisher specific data aggregator 420 may also gather other types of information. As shown in FIG. 4, the publisher specific data aggregator 420 may also collect information related to the publisher's required performance measures because the score floor for each publisher aims at providing a floor that will enable a bidder to meet the required performance measures while achieving its own expected revenue level. As shown, the publisher specific data aggregator 420 accesses the minimum impression rates 212 and minimum response rates 214 as part of the information aggregated for each specific publisher.

The aggregated publisher specific data is then sent to the publisher specific score floor model generator 430 for train/update the publisher specific score floor models. To do so, the publisher specific score model generator 430 also access the revenue requirement data 216, which defines the expected revenue level of the bidder 140. As discussed herein, when the score floor level is too high, too many bids may be filtered out. In this case, even though the impression rate will increase, both the response rate and the revenue level will go down. To balance, the score floor model generated is to balance all considerations to come up with a score floor that allows the bidder to meet both the impression rate and the response rate requirements of the publisher and at the same time, the expected revenue level of the bidder.

The score floor models may be re-trained/updated in different modes. In some embodiments, the score floor models may be re-trained in a batch mode. In the batch mode, each publisher specific score floor model may be re-trained based on all historic data. In other embodiments, the publisher specific score floor models may be updated in a derivative manner. That is, whenever there are additional impression feedback data is received, the relevant publisher specific score floor model may be adjusted based on the additional impression data. In this manner, each time when new impression data is available, the relevant model may be tweaked accordingly. The two modes of updating the models may both be performed. For example, the derivative update may happen whenever new impression data is received. Then within a certain time frame, a batch mode model update may be scheduled and the re-training in this batch mode will use all historic impression data to re-train the score floor models. The combination of both modes may make the models adaptive to changes whenever they happen and at the same time, the models may be regularly re-trained using all historic data so that the update of models may be performed in a more global manner. Details of how the publisher specific score floor model is generated will be discussed below. The dynamically trained/updated model is then saved in the score floor models 220.

Figure 5:
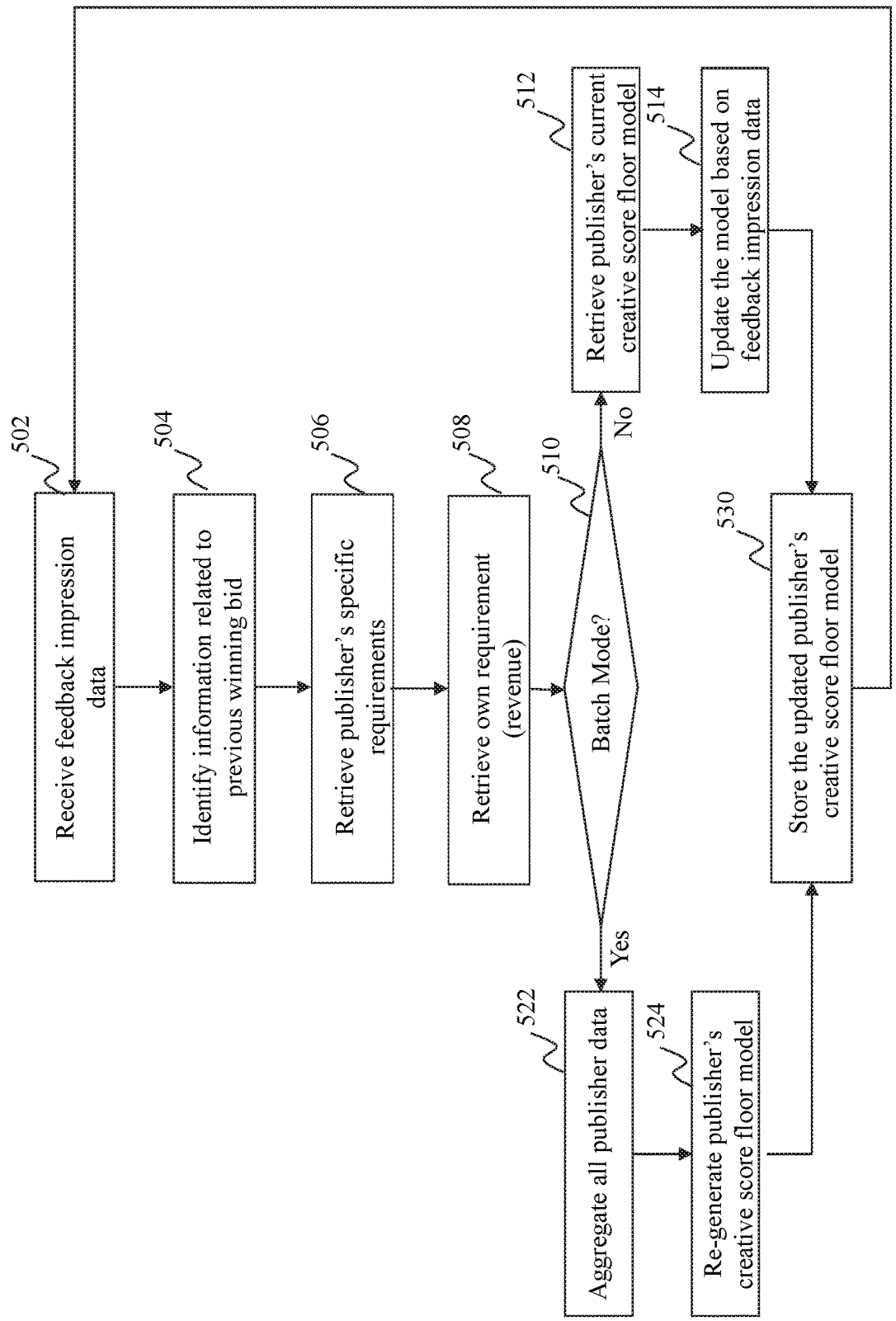
FIG. 5 is a flowchart of an exemplary process for a dynamic score floor model generator, according to an embodiment of the present teaching.

FIG. 5 is a flowchart of an exemplary process for the dynamic score floor model generator 210, according to an embodiment of the present teaching. At 502, feedback impression data is received. Information related to the previous winning bids is then identified, at 504, from the received impression data. Such previous winning bids may be linked to different publishers. To update publisher specific score floor models associated with the publishers linked to the identified winning bids, the dynamic score floor model generator 210 retrieves, at 506 and 508, performance requirements of each publisher as well as the revenue requirement, respectively.

To proceed with the update of the models, it is determined, at 510, whether the update is to be performed in a batch mode or not. If batch mode update is going to be performed, the dynamic score floor model generator 210 aggregates, at 522, all historic data associated with publishers and then re-train the publisher specific score floor models to generate, at 524, the updated score floor models. Such updated score floor models are then saved, at 530, for future use. When the update is to be performed in a derivative mode, determined at 510, the current score floor models related to the publishers linked to the received impression data are retrieved, at 512, and the received impression data is then used to adjust the publishers' specific score floor models, respectively, at 514, and the adjusted models are then saved, at 530, as updated publisher specific score floor models. Once updated, the process goes back to 502 to receive additional impression data and the process of updating the score floor models repeats.

In some embodiments, a publisher specific score floor model may be framed as an optimization problem subject to multiple constraints related to the publisher's performance requirements and the bidder's expected revenue. For example, denote the maximal bid for each auction as $$b_\alpha^I = \max_i \{b_{i,\alpha}\}$$

where $b_\alpha^I$ may be chosen based on, e.g., the return value of the bids. In some embodiments, a score floor model for a publisher is derived by optimizing the following function (with respect to the publisher's required impression rate):

$$R^F(w, r, p, S) = \operatorname{argmax}_F \frac{\sum_a 1_{S(I,x) \geq F} w(b_\alpha^I) S(I, x)}{\sum_a 1_{b_\alpha^I > 0} 1_{S(I,x) \geq F}}$$

Subject to the following constraints related to the publisher's required response rate as well as the expected revenue of the bidder:

$$\frac{\sum_a 1_{b_\alpha^I > 0} 1_{S(I,x) \geq F}}{\sum_a 1_{b_\alpha^I > 0}} \geq \beta$$

$$\frac{\sum_a 1_{S(I,x) \geq F} b_\alpha^I w(b_\alpha^I) S(I, x)}{\sum_a b_\alpha^I w(b_\alpha^I) S(I, x)} \geq \alpha$$

In the above equations, I represents a bid from a bidder, x represents an inventory or an advertisement, S(I,x) represents the score for inventory (advertisement) x involved in a bid I, F represents the score floor for the publisher, β represents the publisher's required minimum response rate, α represents the expected revenue level of the bidder, and $w(b_\alpha^I)$ represents a winning rate related to downstream auction. When $b_\alpha^I=0$, it means that there is no bid and thus w(0)=0 (meaning wining rate=0). If $b_\alpha^I>0$ and there is no downstream auction, w(b)=1. The following define the values of various functions in the formulae above:

$$1_{S(I,x) \geq F} = 1, \text{ if } S(I,x) \geq F, \ 1_{S(I,x) \geq F} = 0, \text{ if } S(I,x) < F$$

$$1_{b_\alpha^I > 0} = 1, \text{ if } b_\alpha^I > 0, \ 1_{b_\alpha^I > 0} = 0, \text{ if } b_\alpha^I <= 0,$$

This optimization process is to adjust the value of F to maximize $R^F(w, r, P, \text{ and } S)$, which represents the optimized impression rate subject to the constraints related to α and β, where r represents a raw bid amount, p represents the probability of the inventory will occur, and S the score. It is assumed that α=α(L) and β=β(L), where L represents a level of a waterfall structure of the bidder.

As depicted in FIGS. 2A and 2B, the score floor established by the score floor models can be used either by an exchange to select the bids solicited from downstream bidders (FIG. 2A) or by a bidder (without downstream bidder) to select bids in its own inventory (FIG. 2B). In either situation, a bid to be submitted to a publisher in response to a bid request is selected in accordance with a score floor established dynamically for that publisher. Thus, the score floor model based bid generator in either situation (230 or 230-1) is an application of the dynamically established score floors for different publishers.

Figure 6:
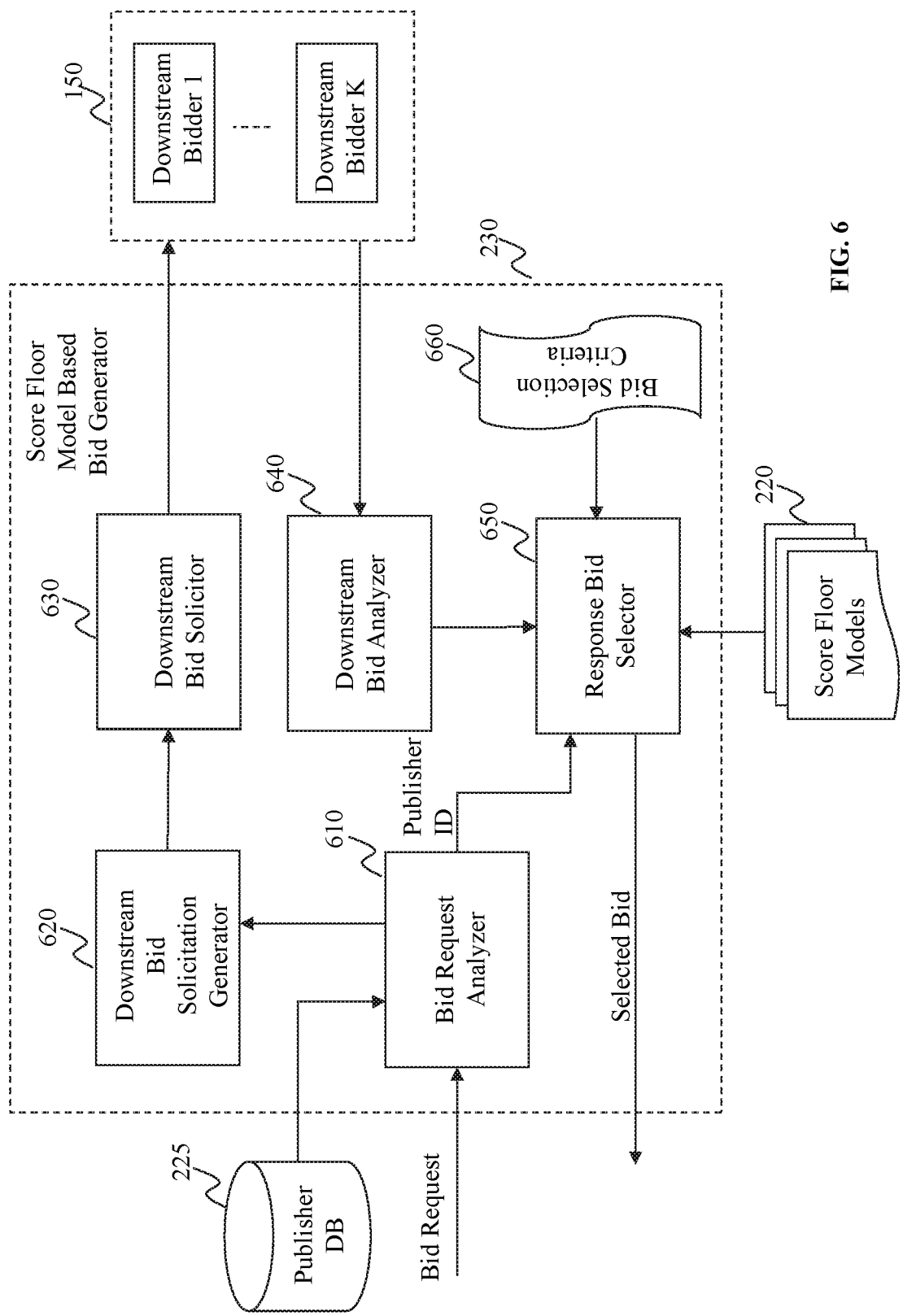
FIG. 6 depicts an exemplary high level internal system diagram of a score floor model based bid generator, according to an embodiment of the present teaching.

FIG. 6 depicts an exemplary internal system diagram for the score floor based bid generator 230 for an exchange as shown in FIG. 2A, according to an embodiment of the present teaching. In this exemplary embodiment, the score floor based bid generator 230 comprises a bid request analyzer 610, a downstream bid solicitation generator 620, a downstream bid solicitor 630, a downstream bid analyzer 640, and a response bid selector 650. When the bidder 140 receives a bid request from a publisher, the bid request analyzer 610 analyzes the bid request and retrieves information related to the publisher that issues the bid request. The publisher's information may be used in determining which downstream bidders that the exchange is to solicit downstream bidders. Based on the bid request and the publisher's information, the bid request analyzer 610 invokes the downstream bid solicitation generator 620 to generate downstream bid solicitations. The downstream bid solicitation generator 620 may determine a group of downstream bidders based on who is the publisher that requested the bid. With that determination, the downstream bid solicitor 630 is invoked to solicit downstream bids from its connected downstream bidders 150.

When the downstream bid analyzer 640 in the score floor model based bid generator 230 receives the downstream bids from the downstream bidders to which a solicitation is sent and analyzes the received downstream bids. Such an analysis includes computing a score for each of the downstream bids so that each downstream bid may be evaluated according to the computed score against, e.g., the score floor established specifically for the publisher from which the bid request is received.

The response bid selector 650 then selects, based on various criteria, one of the downstream bids as a response bid for the bid request from the publisher. The response bid selector 650 may first filter the received downstream bids based on the established score floor for the publisher. In some embodiments, any downstream bid with a score below the score floor may be removed from further consideration. For the downstream bids that are above the score floor associated with the publisher, further selection may be performed to identify one downstream bid as a response bid which is to be presented to the publisher. As discussed herein, as the score floor models 220 are derived dynamically based on historic feedback data, the score floor models 220 provide dynamically adjusted way to filter downstream bids in order to ensure that any response bid selected to be submitted to a publisher has an optimized chance to satisfy the performance requirement (lead to impression and at the same time achieve required response rate) and, at the same time, meet the expected revenue requirement of the exchange.

The further selection of a response bid from the filtered downstream bids may be performed in accordance with other criteria, such as the economic potential associated with each of the remaining downstream bids. As shown in FIG. 6, to select a response bid, the response bid selector 650 may access information stored in an archive 660 which may store different bid selection criteria related to various considerations, e.g., estimated probability of a bid being selected as a winning bid by the publisher, the financial potential of a bid if it is selected as a winning bid, etc. The selected response bid is then sent to the publisher as a response to the bid request.

Figure 7:
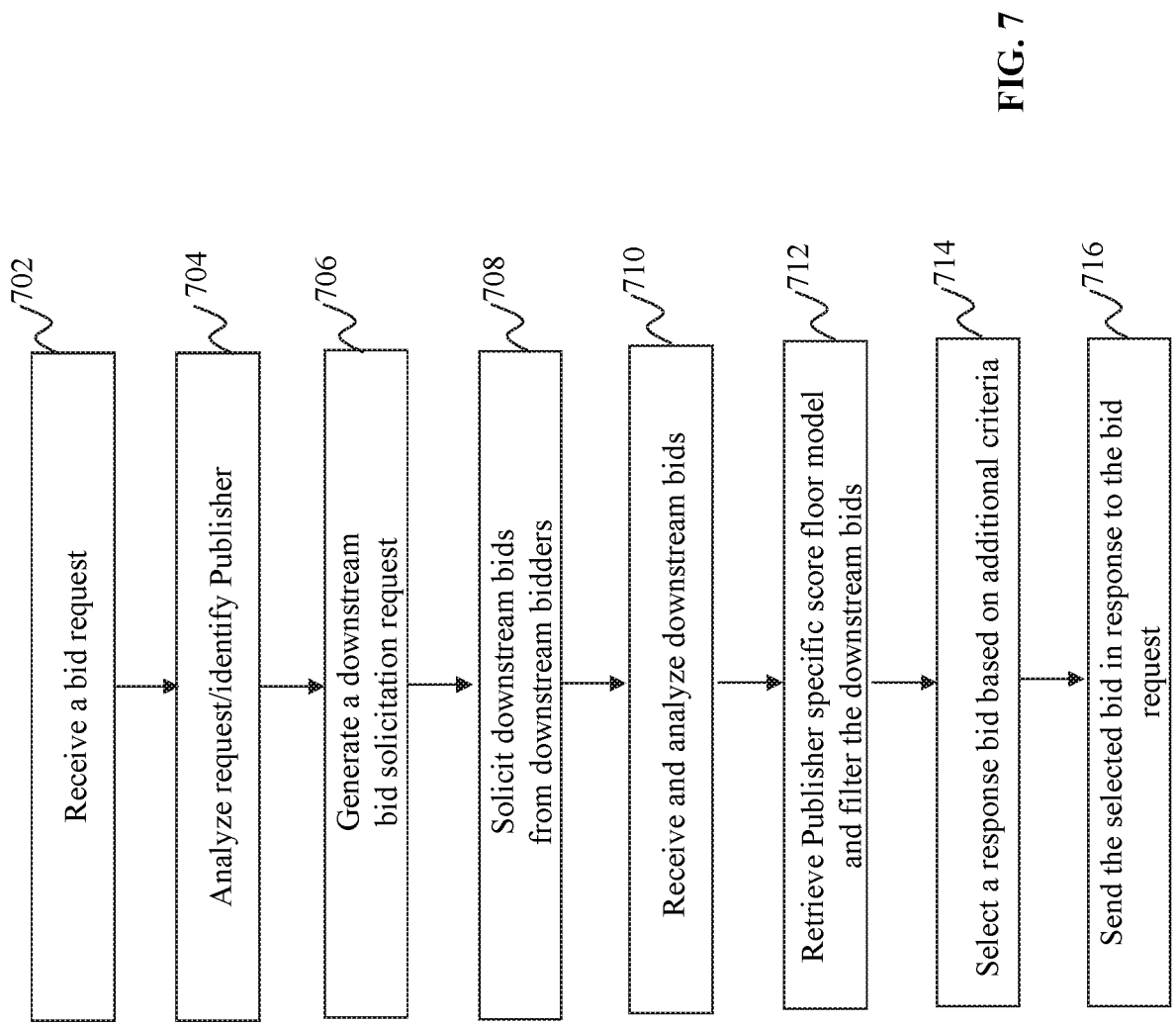
FIG. 7 is a flowchart of an exemplary process of a score floor model based bid generator, according to an embodiment of the present teaching.

FIG. 7 is a flowchart of an exemplary process of the score floor model based bid generator 230, according to an embodiment of the present teaching. A bid request is first received at 702. The bid request is analyzed at 704 and the publisher associated with the bid request is also identified. To solicit downstream bids, a downstream bid solicitation request is generated at 706 and is sent, at 708, to one or more connected downstream bidders to solicit bids. When downstream bids are received, at 710, from downstream bidders, they are analyzed, e.g., their respective scores are computed. Such scores are used to filter those downstream bids that may not lead to impressions. To achieve that, score floor model(s) specific to the publisher is retrieved at 712 and used to filter the received downstream bids so that only those downstream bids that have a score higher than the specific score floor remain for further selection. To identify a response bid for the publisher, additional selection criteria are used, at 714, to select a response bid from the remaining downstream bids. The selected response bid is then sent, at 716, to the publisher as a response to the bid request.

Figure 8:
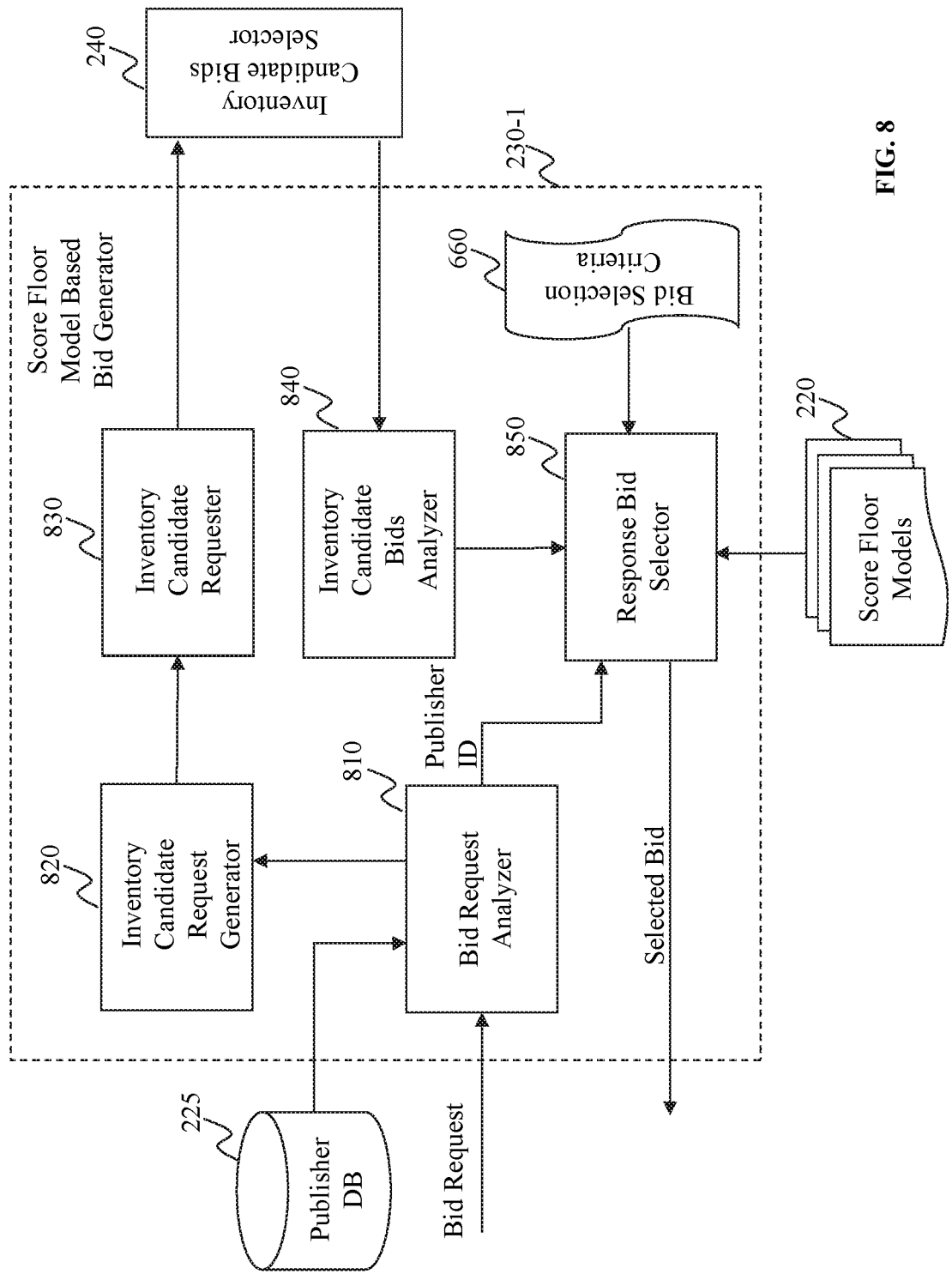
FIG. 8 depicts another exemplary high level internal system diagram of a score floor model based bid generator, according to a different embodiment of the present teaching.

FIG. 8 depicts an exemplary internal system diagram for the score floor based bid generator 230-1 for a direct bidder as shown in FIG. 2B, according to an embodiment of the present teaching. In this exemplary embodiment, the score floor based bid generator 230-1 is constructed similarly as what is shown in FIG. 6 except that solicitation of downstream bids is now directed to the inventory candidate bids selection from the inventory database 235 of the bidder 140. In this exemplary embodiment, the score floor based bid generator 230-1 comprises a bid request analyzer 810, an inventory candidate request generator 820, an inventory candidate requester 830, an inventory candidate bids analyzer 840, and a response bid selector 850. When the bidder 140 receives a bid request from a publisher, the bid request analyzer 810 analyzes the bid request and retrieves information related to the publisher that issues the bid request. The publisher's information may be used in determining which types of inventory candidate ads to be retrieved from the inventory database 235. Based on the bid request and the publisher's information, the bid request analyzer 810 invokes the inventory candidate request generator 820 to generate an inventory candidate request. The inventory candidate request generator 820 may determine one or more specific types of ad candidates to be selected from the inventory database 235. For example, certain publishers may prefer advertisements of certain categories for consideration.

With that determination, the inventory candidate requester 830 is invoked to request the inventory candidate bids selector 240 to provide candidate bids from the inventory database 235.

When the inventory candidate bids selector 240 returns one or more candidates, the inventory candidate bids analyzer 840 analyzes the received candidate bids. Such an analysis includes computing a score for each of the candidate bids so that each downstream bid may be evaluated according to its computed score against, e.g., the score floor established specifically for the publisher from which the bid request is received.

The response bid selector 850 then selects, based on various criteria, one of the candidate bids as a response bid. The response bid selector 850 may first filter the received candidate bids based on the established score floor specific for the publisher. In some embodiments, any candidate bid with a score below the score floor may be removed from further consideration. For the candidate bids that are above the score floor associated with the publisher, further selection may be performed to identify one downstream bid as a response bid which is to be presented to the publisher. As discussed herein, as the score floor models 220 are derived dynamically based on historic feedback data, the score floor models 220 provide dynamically adjusted way to filter downstream bids in order to ensure that any response bid selected to be submitted to a publisher has an optimized chance to satisfy the performance requirement (lead to impression and at the same time achieve required response rate) and, at the same time, meet the expected revenue requirement of the exchange.

The further selection of a response bid from the filtered downstream bids may be performed in accordance with other criteria, such as the economic potential associated with each of the remaining downstream bids. As shown in FIG. 8, to select a response bid, the response bid selector 850 may access information stored in an archive 660 which may store different bid selection criteria related to various considerations, e.g., estimated probability of a bid being selected as a winning bid by the publisher, the financial potential of a bid if it is selected as a winning bid, etc. The selected response bid is then sent to the publisher as a response to the bid request.

Figure 9:
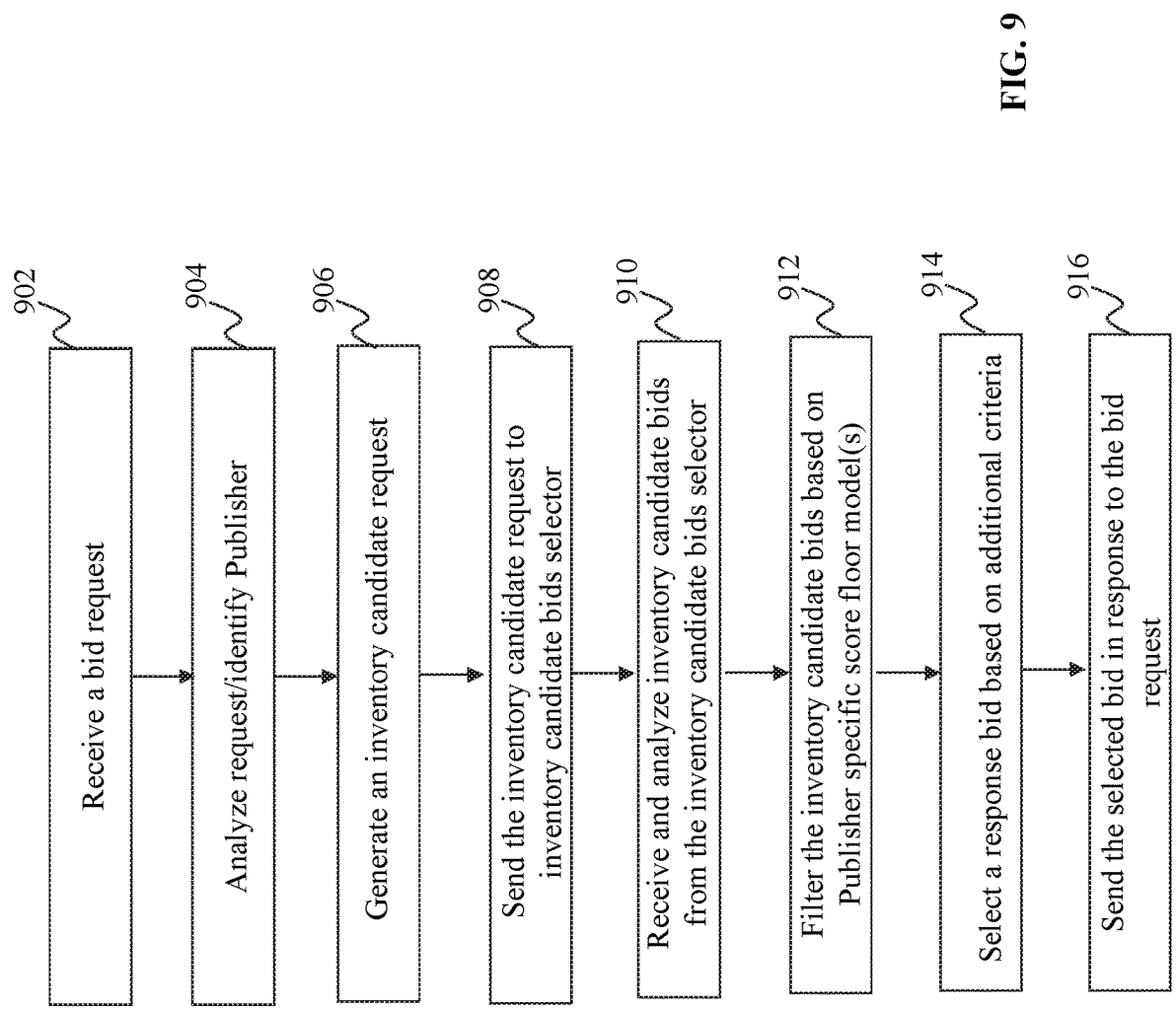
FIG. 9 is a flowchart of another exemplary process of a score floor model based bid generator, according to a different embodiment of the present teaching.

FIG. 9 is a flowchart of an exemplary process of the score floor model based bid generator 230-1, according to an embodiment of the present teaching. A bid request is first received at 902. The bid request is analyzed at 904 and the publisher associated with the bid request is also identified. To identify candidate bids from the inventory, an inventory candidate request is generated at 906 and is sent, at 908, to the inventory candidate bids selector 240. When inventory candidate bids are received, at 910, from the inventory candidate bids selector 240, they are analyzed, e.g., their respective scores are computed. Such scores are used to filter those candidate bids that may not lead to impressions. To achieve that, score floor model(s) specific to the publisher is retrieved and used, at 912, to filter the received candidate bids from the inventory so that only those candidate bids that have a score higher than the specific score floor for the publisher remain for further selection. To identify a response bid for the publisher, additional selection criteria are used, at 914, to select a response bid from the remaining candidate bids. The selected response bid is then sent, at 916, to the publisher as a response to the bid request.

Figure 10:
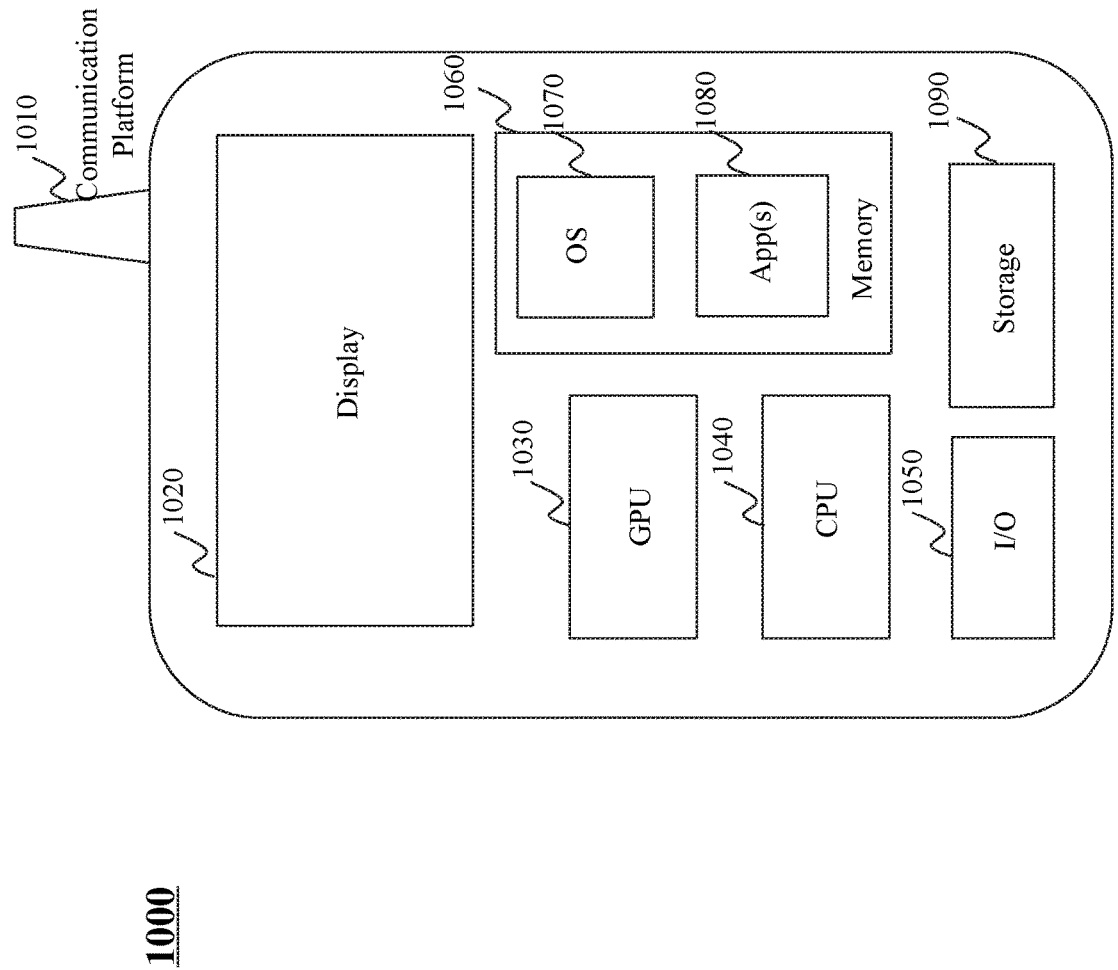
FIG. 10 depicts the architecture of a mobile device which can be used to implement a specialized system incorporating the present teaching.

FIG. 10 depicts the architecture of a mobile device which can be used to realize a specialized system implementing the present teaching. This mobile device 1000 includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teachings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 11:
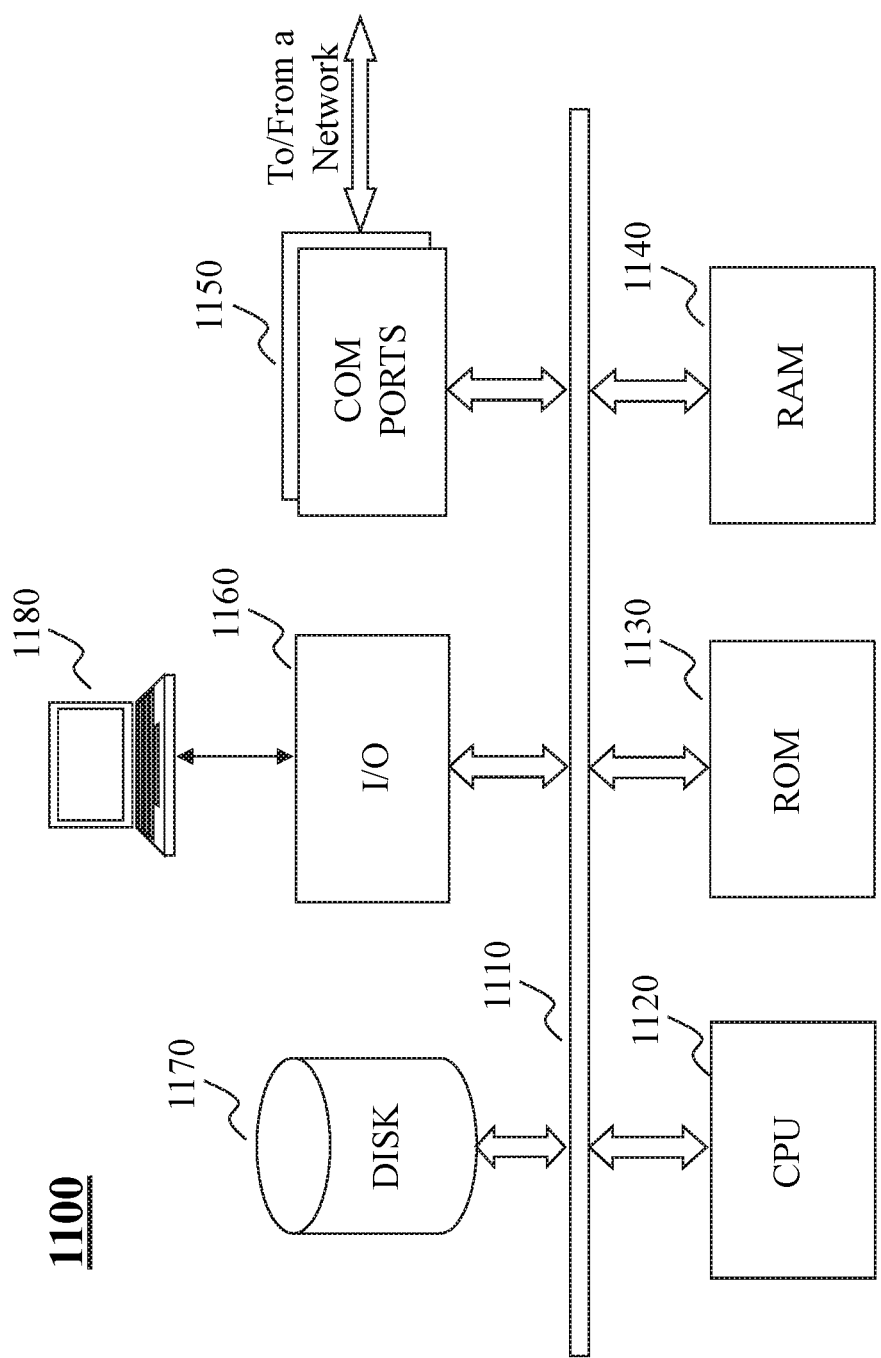
FIG. 11 depicts the architecture of a computer which can be used to implement a specialized system incorporating the present teaching.

FIG. 11 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1100 may be used to implement any component of the present teachings, as described herein. Although only one such computer is shown, for convenience, the computer functions relating to the present teachings as described herein may be implemented in a distributed fashion on a number of similar platforms, to distribute the processing load.

The computer 1100, for example, includes COM ports 1150 connected to and from a network connected thereto to facilitate data communications. The computer 1100 also includes a central processing unit (CPU) 1120, in the form of one or more processors, for executing program instructions. The exemplary computer platform includes an internal communication bus 1110, program storage and data storage of different forms, e.g., disk 1170, read only memory (ROM) 1130, or random access memory (RAM) 1140, for various data files to be processed and/or communicated by the computer, as well as possibly program instructions to be executed by the CPU. The computer 1100 also includes an I/O component 1160, supporting input/output flows between the computer and other components therein such as user interface element. The computer 1100 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computer having at least one processor, a storage, and a communication platform, comprising:
receiving, by the at least one processor via the communication platform, feedback information about a plurality of bids previously submitted by a bidder to a publisher, wherein the feedback information indicates whether each of the plurality of bids led to an impression;
obtaining, by the at least one processor, a first set of metrics specified by the publisher;
retrieving, by the at least one processor, a second set of metrics to be applied to the bidder; and
dynamically updating, by the at least one processor, a score floor model with respect to the publisher based on the feedback information as well as the first and second sets of metrics, wherein the score floor model is used to determine a dynamic threshold metric to be used to filter future bids to generate filtered future bids from which one or more of the filtered future bids that satisfy the first and second sets of metrics are selected.

2. The method of claim 1, further comprising:
receiving, at the bidder, a bid request from the publisher;
identifying, by the bidder via the at least one processor, a set of candidate bids based on the bid request;
filtering the set of candidate bids based on the score floor model and the dynamic threshold metric to generate a selection pool of candidate bids;
selecting, from the selection pool of candidate bids, a response bid based on at least one criterion; and
transmitting the selected response bid to the publisher in response to the bid request.

3. The method of claim 2, wherein identifying the set of candidate bids comprises:
generating a downstream bid solicitation request based on the bid request;
transmitting the downstream bid solicitation request to one or more downstream bidders associated with the bidder; and
receiving, from the one or more downstream bidders, the set of candidate bids.

4. The method of claim 2, wherein identifying the set of candidate bids comprises:
generating an inventory candidate request based on the bid request;
transmitting the inventory candidate request to an inventory candidate bids selector; and
receiving, from the inventory candidate bids selector, the set of candidate bids.

5. The method of claim 1, wherein the first set of metrics includes an impression rate, a response rate, or the impression rate and the response rate, wherein the impression rate and the response rate are specified with respect to the bidder.

6. The method of claim 1, wherein the second set of metrics includes an expected level of revenue associated with the bidder.

7. The method of claim 1, wherein the score floor model is dynamically updated in a batch mode or a derivative mode.

8. A system comprising at least one processor, storage, and a communication platform connected to a network, comprising:
a dynamic score floor model generator implemented by the at least one processor configured for dynamically generating a score floor model with respect to a publisher, wherein the score floor model is used to determine a dynamic threshold metric to be used to filter future bids to the publisher to generate filtered future bids from which one or more of the filtered future bids that satisfy a first set of metrics and a second set of metrics are selected; and
a score floor model based bid generator implemented by the at least one processor configured for identifying a response bid selected based on the score floor model in response to a bid request received from the publisher.

9. The system of claim 8, wherein the dynamic score floor model generator comprises:
a feedback data analyzer configured for receiving feedback information about a plurality of bids previously submitted by a bidder to a publisher, wherein the feedback information indicates whether each of the plurality of bids led to an impression;
a publisher specific data aggregator configured for obtaining the first set of metrics specified by the publisher;
a publisher specific score floor model generator configured for:
retrieving the second set of metrics to be applied to the bidder;
dynamically updating the score floor model with respect to the publisher based on the feedback information, the first set of metrics, and the second set of metrics, wherein the updated score floor model is used to determine the dynamic threshold metric.

10. The system of claim 8, wherein the score floor model based bid generator comprises:
a bid request analyzer configured for receiving and analyzing a bid request from the publisher;
a candidate bid solicitor configured for identifying a set of candidate bids based on the bid request;
a response bid selector configured for:
filtering the set of candidate bids based on the score floor model and the dynamic threshold metric to generate a selection pool of candidate bids,
selecting, from the selection pool of candidate bids, a response bid based on at least one criterion, and
transmitting the selected response bid to the publisher in response to the bid request.

11. The system of claim 10, wherein the candidate bid solicitor is one of:
a downstream bid solicitor configured for soliciting the set of candidate bids from one or more downstream bidders; or
an inventory candidate requester configured for selecting the set of candidate bids from an inventory candidate bids selector.

12. The system of claim 8, wherein the first set of metrics an impression rate, a response rate specified with respect to the bidder, or the impression rate and the response rate.

13. The system of claim 8, wherein the second set of metrics includes an expected level of revenue associated with the bidder.

14. The system of claim 8, wherein the dynamic score floor model generator dynamically updates the score floor model in a batch mode or a derivative mode.

15. A machine readable non-transitory medium having information stored thereon, wherein the information, when read by the machine, causes the machine to perform:
receiving feedback information about a plurality of bids previously submitted by a bidder to a publisher, wherein the feedback information indicates whether each of the plurality of bids led to an impression;
obtaining a first set of metrics specified by the publisher;
retrieving a second set of metrics to be applied to the bidder; and
dynamically updating a score floor model with respect to the publisher based on the feedback information as well as the first and second sets of metrics, wherein:
the score floor model is used to determine a dynamic threshold metric to be used to filter future bids to generate filtered future bids from which one or more of the filtered future bids that satisfy the first and second sets of metrics are selected.

16. The medium of claim 15, wherein the information, when read by the machine, further causing the machine to perform:
receiving a bid request from the publisher;
identifying a set of candidate bids based on the bid request;
filtering the set of candidate bids based on the score floor model and the dynamic threshold metric to generate a selection pool of candidate bids;
selecting, from the selection pool of candidate bids, a response bid based on at least one criterion; and
transmitting the selected response bid to the publisher in response to the bid request.

17. The medium of claim 16, wherein identifying the set of candidate bids comprises:
generating a downstream bid solicitation request based on the bid request;
transmitting the downstream bid solicitation request to one or more downstream bidders associated with the bidder; and
receiving, from the one or more downstream bidders, the set of candidate bids.

18. The medium of claim 16, wherein identifying the set of candidate bids comprises:
generating an inventory candidate request based on the bid request;
transmitting the inventory candidate request to an inventory candidate bids selector; and
receiving, from the inventory candidate bids selector, the set of candidate bids.

19. The medium of claim 15, wherein:
the first set of metrics includes an impression rate, a response rate specified with respect to the bidder, or the impression rate and the response rate; and
the second set of metrics includes an expected level of revenue associated with the bidder.

20. The medium of claim 15, wherein the score floor model is dynamically updated in a batch mode or a derivative mode.

* * * * *